United States Patent

[11] 3,577,201

[72] Inventors Jesse T. Quatse
Pittsburgh, Pa.;
Brook Dixon, Seldon, N.Y.

[21] Appl. No. 696,174
[22] Filed Jan. 8, 1968
[45] Patented May 4, 1971
[73] Assignee Vernitron Corporation
Farmingdale, N.Y.

[54] PORTABLE COMPUTER TERMINAL
5 Claims, 7 Drawing Figs.

[52] U.S. Cl. ........ 179/2DP
[51] Int. Cl. ........ H04m 11/06
[50] Field of Search ........ 179/2 (DP), 2, 2 (R), 3, 4; 325/30; 178/58, 66, 53

[56] References Cited
UNITED STATES PATENTS
3,226,480 12/1965 Wright ........ 179/15
3,261,922 7/1966 Edson et al. ........ 179/15

*Primary Examiner*—Kathleen H. Claffy
*Assistant Examiner*—Thomas D'Amico
*Attorney*—Edward H. Loveman

ABSTRACT: The invention is concerned with a logic decoder means which senses a signal indicative of whether a teletype machine or a computer originates a communicative line between a portable computer terminal and the computer. The modulator and demodulator within the portable terminal computer operate in different frequency bands and have filter networks adapted to be switched into circuit with the information signals, in response to output signals from the logic decoder and thereby set the respective frequency bands in the modulator and demodulator.

| Mode of Operation | Lines | Frequency | |
|---|---|---|---|
| | | Space | Mark |
| Teletype originates | A & A' | 1070 | 1270 Hz |
| | B & B' | 2025 | 2225 Hz |
| Computer originates | A & A' | 2025 | 2225 Hz |
| | B & B' | 1070 | 1270 Hz |

INVENTORS

BY Jessie T. Quatse
Brook Dixon

Edward H. Loveman
ATTORNEY

INVENTORS

BY Jessie T. Quatse
Brook Dixon

Edward H. Loveman
ATTORNEY

INVENTORS

BY Jessie T. Quatse
Brook Dixon

Edward H. Loveman
ATTORNEY

PORTABLE COMPUTER TERMINAL

The present invention relates to computer terminals and more particularly to a portable computer terminal capable of connecting a teletype machine to a computer over ordinary telephone lines for transmission and reception of information.

Copending patent application, Ser. No. 620,760, now U.S. Pat. No. 3,505,474 filed Mar. 6, 1967 discloses a computer terminal which is adapted for connection to an ordinary telephone receiver, and in which audio tones are generated or received in frequency bands which depend on whether a computer or a teletype machine in the terminal originates a call. The origination of the call by the terminal is achieved by manually dialing a number assigned to a computer, on the telephone, by an operator, the computer being programmed to accept such communication; or, if the computer is to originate a call by having a stored program in the computer which provides telephone dial impulses, so that the telephone to which the portable computer terminal is attached, will ring. Ringing of the telephone will then permit the terminal to accept messages from the computer.

Four different frequencies are used to provide tone modulated pulse transmission. Frequencies of 1270 and 1070 Hz. represent mark and space signals, respectively, for signals to be transmitted, that is, for signals generated by the equipment which originates the call. Frequencies of 2225 and 2025 Hz. represent respective mark and space signals of the answering equipment. Since as hereinabove mentioned the terminal may at times initiate communication with the computer and at other times the computer may initiate communication with the terminal, the terminal must have the capability of generating all four frequencies, and of specifically recognizing and decoding all four frequencies and providing output signals in accordance therewith. Computers, with their inherent capability of signal generation, their memory equipment, and the like can readily be programmed to carry out these functions; the present invention is, however, directed more particularly to such a terminal.

A modulator means which codes the information to be transmitted by the terminal includes a plurality of switchable filter circuits. The particular one of these filter circuits, which determines the modulator frequency, is switched in circuit depending upon whether the call is originated by the terminal (band 1070 and 1270 Hz.) or whether the terminal is answering a call originated by the computer (band 2025 and 2225 Hz.). Additionally, the particular frequency within the band, namely, whether 1270 or 1070 in the one band and whether 2225 and 2025 in the other, and denoting either "mark" and "space" signals is determined by switching other branches of the filter circuit. The filter circuit may be part of an oscillator, such as a multivibrator circuit which provides the proper tone modulated pulses. Further filtering circuits, and wave-shaping circuits to provide sine-wave outputs from the normally square waves of the multivibrator may additionally be provided, such filters being further switchable between the two "originate" and "answer" bands.

Since the terminal must be responsive to calls originated by the computer, demodulator means are provided also having frequency selective networks therein which are switchable broadly between the bands corresponding to the "originate" and "answer" mode, and further circuits which distinguish in those two modes between "mark" and "space" signals. The entire equipment is preferably transistorized so that a small and inexpensive terminal can be provided.

It is accordingly a primary object of the present invention to provide a computer terminal which is portable, and versatile to communicate with a computer.

It is an additional object of the present invention to provide a portable computer terminal capable of operation in both originate and answer modes, and thus capable of communicating with the computer in a plurality of different frequency bands.

It is a further object of the present invention to provide a computer terminal having frequency selective networks which are switchable between bands corresponding to the originate mode and the answer mode.

These and other objects and many of the attendant advantages of this invention will be readily appreciated as the same becomes better understood by reference to the following detailed description when considered in connection with the accompanying drawings in which.

Figures 1, 2:
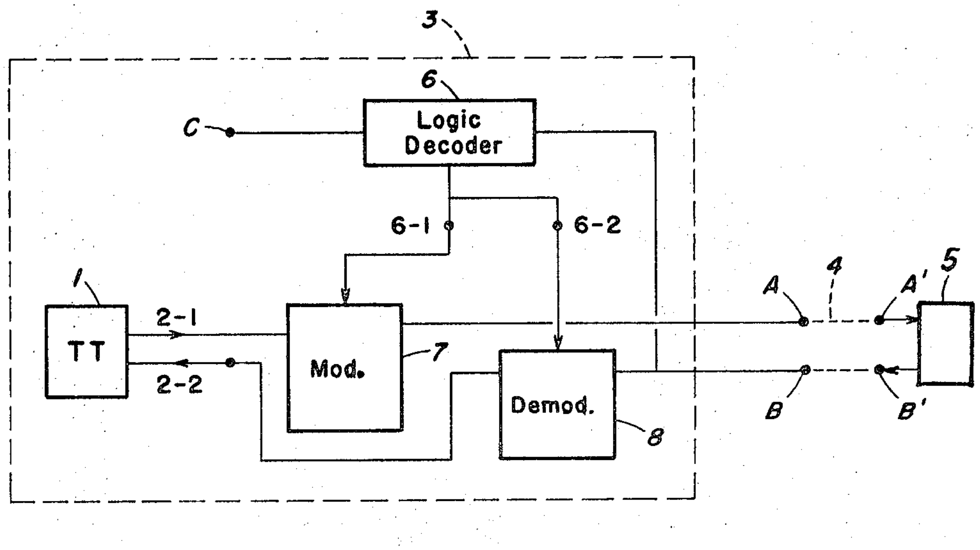
FIG. 1 is a block diagram of a computer terminal in a communication link with a computer.
FIG. 2 is a table indicating frequency distribution on the various communication lines interconnecting the computer terminal and the computer.

Referring now to the drawings, wherein like reference characters designate like or corresponding parts throughout the several views, there is illustrated in FIG. 1 a block diagram of a computer terminal 3 which incorporates the present invention in a communication link with a computer 5. Computer terminal 3 includes a conventional portable teletype terminal 1 having terminals 2–1 and 2–2. Terminal 2–1 provides "-mark" and "space" signals in response to depression of particular keys of the teletype keyboard (not shown) thereby producing a teletypewriter code as is well known in the art. The terminal 2–1 is connected to a modulator 7 which will generate audio output pulses to a terminal A at frequencies in accordance with a selected one of the two modes of operation illustrated in Table 2. Terminals A and B may be the output terminals of the respective transmitter and receiver portions of a conventional telephone handset. The terminals A and B are coupled over telephone lines schematically indicated by broken lines 4 to respective terminals A′, B′ of a computer 5. The receiver terminal B is connected to a demodulator 8 and has its output applied to a terminal 2–2 of teletype terminal 1 for receiving audio frequency signals at frequency bands in accordance with a selected one of the two modes of operation illustrated in Table 2.

The frequencies of the modes of operation as indicated in FIG. 2 shows that the signals at terminals A–A′ can be transmitted either at the 1070—1270 Hz. frequency band, or at the 2025—2225 Hz. frequency band and similarly the signals at terminals B–B′ can receive in both of these frequencies, depending only on the mode of operation. Thus, the terminal 3 has to be capable of accepting signals of all these frequencies, and further of generating all these frequencies, and additionally selecting the proper response of the circuits within the terminal, both when generating as well as when receiving these frequencies.

To originate a call in conventional teletype communications, it is the practice to send a series of pulses without interruption, which act as "ring" pulses. These pulses may be generated by an operator and will then appear at terminal C, or may be generated by the computer and will then appear at terminal B. Similar to an ordinary telephone conversation, there may be a back-and-forth interplay of communication between the computer and the teletype, so that after the operator has originated a call, information can come back in response to an inquiry of the teletype from the computer. In this event, the signals on line B will be in the higher frequency band. If, however, the computer originates a call, the signals appearing on line B will be in the lower frequency band.

Referring again to FIG. 1, terminal C and terminal B are connected to the input of a logic decoder 6 which determines the originator of the call and controls the frequency band of operation of the modulator 7 and the demodulator 8 as will now be described. As shown in FIg. 1, the output of the logic decoder 6 appears as a binary signal at a terminal 6–1 and a terminal 6–2. A binary ONE at terminals 6–1 and 6–2 may, for example, indicate that a call is originated by the portable computer operator, that is, that ring signals were decoded from the line connected to terminal C, whereas binary ZERO at terminals 6–1 and 6–2 will indicate that a call is originated by the computer, that is, that ringing signals were detected at terminal B.

Figure 3:
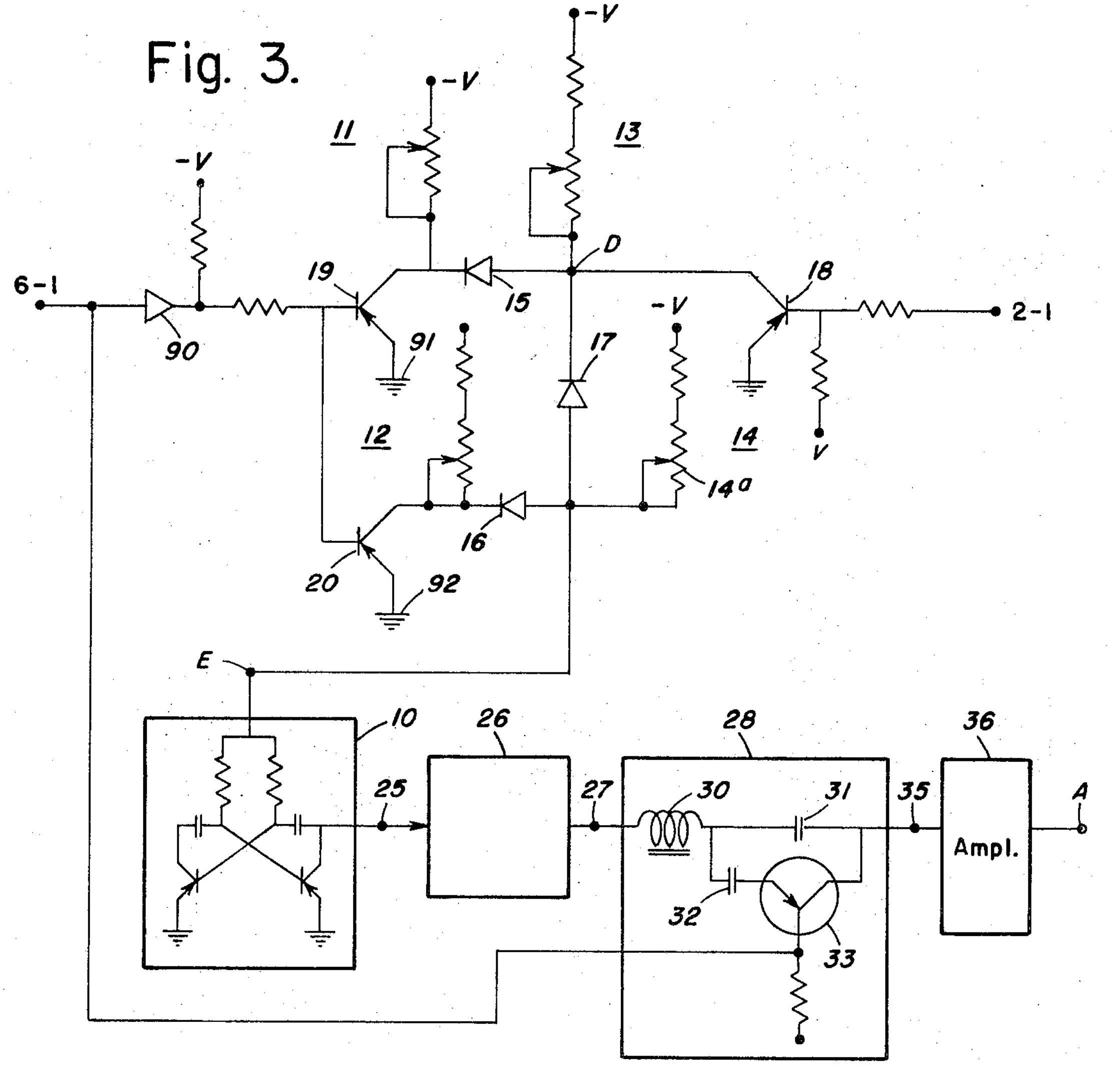
FIG. 3 is a partly schematic, partly block diagram of the modulator.

Referring now to FIG. 3, the modulator 7 includes an oscillator 10, shown schematically as a multivibrator and having an R–C network determining its frequency of oscillation. The R–C network is connected to a terminal E. It includes four resistance branches 11, 12, 13, 14. Branches 11, 12, 13 are connected by diodes 15, 16, 17 to terminal E. Branch 14 is connected directly to terminal E and the setting of its resistance 14*a* determines the basic operating frequency of multivibrator circuit 10.

Diode 17 connects terminal E with a junction D. Junction D is serially connected between diode 15 and the collector of a mark-space control transistor 18*m*, the emitter of which is grounded and the base of which is connected by means of coupling resistances (well known in the art) to terminal 2–1. The mode of operation of the modulator is controlled by transistors 19 and 20 which have their respective collectors connected to respective diodes 15 and 16 and their respective emitters to respective ground branches 91 and 92. The bases of transistors 19 and 20 are connected over a coupling network including diode 90 to terminal 6–1.

In operation, assuming the computer terminal originates the communication link, the output at terminal 6–1 will indicate a binary ONE, the transistors 19, 20 will become conductive shorting resistive networks 11, 12 out of circuit with respect to multivibrator 10 whereby the multivibrator will only operate in the lower, i.e. 1070 or 1270 Hz. frequency band. If terminal 2–1 has a potential on the base of transistor 18, as determined by the voltage divider network connected thereto, transistor 18 will become conductive, thus providing a short circuit across resistor branch 13, whereby diode 17 will block and only resistor branch 14 will be effective. Multivibrator 10 will thus oscillate at a predetermined first frequency, indicating a "space" or in accordance with present standards 1070 Hz. If the terminal 2–1 has no potential applied thereto transistor 18 will be nonconductive and diode 17 will be conductive in view of the negative potential applied over branch 13 and therefore the frequency of multivibrator 10 will rise to 1270 Hz. and thus oscillate at a frequency indicating a "mark."

If the computer originates the communication link, then the output at terminal 6–1 will indicate a binary ZERO and the transistors 19, 20 will both become nonconductive whereby resistive networks 11, 12 are in circuit with respect to multivibrator 10 whereby the multivibrator will operate in the upper, i.e. 2025 or 2225 Hz. frequency band. As before, if terminal 2–1 has a potential applied thereto which overcomes the potential on the base of transistor 18, transistor 18 will become conductive whereby both resistive branches 11 and 13 will short circuit and diode 17 will block and only resistive branches 12 and 14 are in circuit with multivibrator 10. The multivibrator will thus oscillate at a first frequency indicating a "space" or 2025 Hz. If no potential is applied to terminal 2–1, all four resistive networks are in circuit with multivibrator 10 which will now oscillate at a "mark" frequency of 2225 Hz.

The output of multivibrator 10, which appears at terminal 25, is applied to a wave-shaping and filtering network 26, which converts the normal square-wave output of multivibrator 10 to more of a sine-wave shape. In order to provide for still more effective wave shaping, and rejection of high frequency harmonics, the output of filter 26, appearing at terminal 27, is applied to a switchable filter 28. Filter 28 consists essentially of an inductance 30 and a condenser network including condensers 31, 32, one of which can be switched in or out of circuit by means of a transistor 33, controlled again from terminal 6–1. When transistor 33 is rendered conductive, as determined by a ONE at terminal 6–1, condenser 32 will be effectively in parallel with condenser 31; when transistor 33 blocks, the condenser 32 is effectively removed from the circuit. The output of filter 28, in which high frequency harmonics are essentially rejected and which will be effectively a sine-wave output in either the low, or the high frequency band (depending on the input at terminal 6–1) is applied over a terminal 35 to an impedance matching circuit and amplifier 36, which preferably includes an emitter follower, for application of tone-modulated pulses to terminal A.

It is thus apparent that modulator 7 will provide tones of discrete frequencies in one of two separate frequency bands, depending upon whether the computer terminal operates in the "originate" or the "answer" mode and furthermore, the tones will be at a particular frequency within the selected band depending on whether "mark" or "space" pulses are to be sent. Control of the particular frequency band and the particular frequency within the selected band is obtained by switching impedance networks in the oscillator, as determined by the impulses applied to respective inputs 6–1 and 2–1.

It is desirable to indicate the "mark" and "space" signals of the teletype separately and not rely on silence or absence of a signal for either one or the other, since absence of signals may be masked by noise. It is, however, entirely possible for certain installations to leave one of the branches unconnected or to entirely ground or disable the oscillator for "mark" or "space" pulses, respectively if it is not desired to transmit both "mark" and "space" pulses as separate distinct tones.

Signals derived from the computer 5 are applied to receiver terminal B to be decoded. Depending upon whether the computer originates a call, or whether the computer answers a call previously originated by an operator of the computer, terminal 1 will determine the frequency band at which the signals will appear at terminal B. Thus, the demodulator 8 must be capable of decoding signals in either the 1070—1270 frequency band or in the 2025—2225 frequency band.

Figure 4:
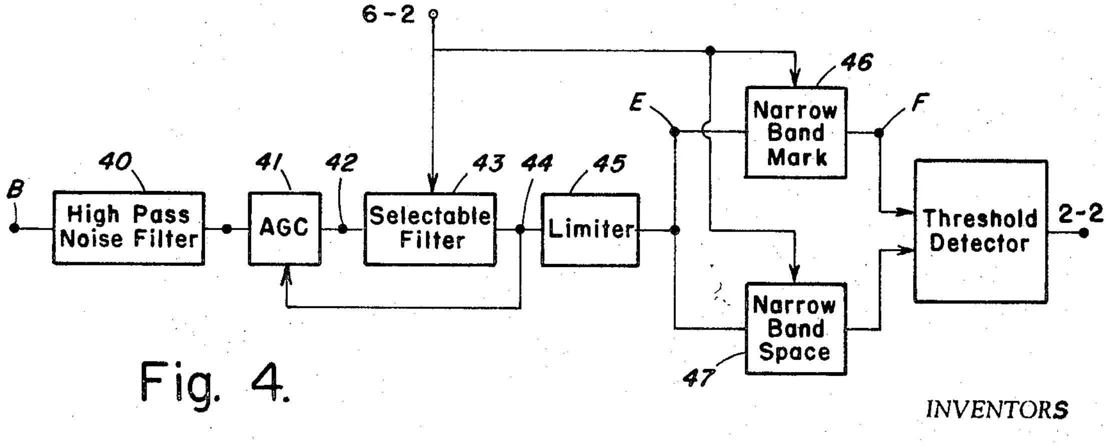
FIG. 4 is a block diagram of the demodulator.

Referring now to FIG. 4, the demodulator 8 is connected to terminal B and includes a high pass noise filter 40, which cuts off all signals below, for example, 800 Hz. to pass only signals within the desired tone-modulated bands. Filter 40 is connected to an automatic gain control circuit 41, having an output appearing at terminal 42. Feedback for the automatic gain control can be taken off any suitable point in a well-known manner, for example, terminal 44. Terminal 42 is connected to a selectable filter 43, which is set to one of the two modes of operation (answer or originate) as determined by a control input from terminal 6–2. The output of selectable filter 43, now sharply filtered within the high or the low operating bands, appears at terminal 44 and is applied to a limiter 45, the output of which is branched to a pair of narrow-band filters 46 and 47, which can again be switched between the high and low bands, respectively, but which respond separately to the mark or space frequencies within the frequency bands. Thus, filter 46 operates only to pass frequencies of 1070 and 2025 Hz.; and filter 47 to pass only frequencies of 1270 and 2225 Hz. The output of filters 46, 47 is applied to a threshold detector, the output of which can be applied to amplifiers and drivers, not shown, and connected to terminal 2–2 to operate the teletype machine whereby the information supplied from the computer may be recorded.

Figure 5:
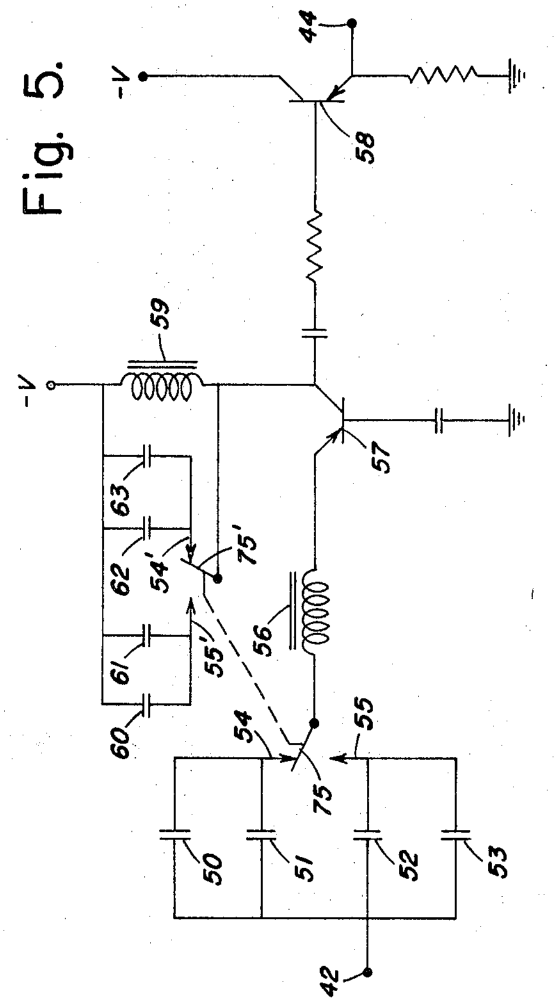
FIGS. 5 and 6 are partly schematic diagrams of filter circuits used in the demodulator of FIG. 4.

Filter 43 is shown in greater detail in FIG. 5 to which reference will now be had. Input 42 is connected to a condenser bank, consisting of condensers 50-53 which are paired together with one of the pairs selectively placed in circuit with information signals by means of a switch arm 75 and a relay 54 or 55. The switch arm 75 is coupled to an inductance 56, then over amplifying and impedance matching transistors 57, 58 to output terminal 44. To further sharply define the band pass of the network the collector of transistor 57 has a bank of condensers 60—63 in parallel with the inductance 56 connected to the emitter of transistor 57 to form a resonant network. The particular condensers are again paired together with one of the pairs switched over by means of either one of relay contacts 54′ or 55′ and switch 75′ which is coupled to switch 75 and therefore similarly operated.

Figure 7:
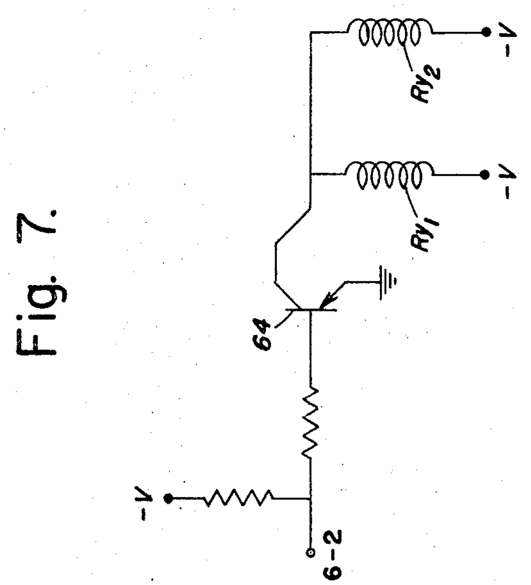
FIG. 7 is a schematic diagram of the relay used to change the characteristics of the filters illustrated in FIGS. 5 and 6.

The relay switches 75 and 75' are under control of a relay coil Ry-1, the state of which is determined by an input applied to terminal 6-2 as illustrated in FIG. 7. Terminal 6-2 controls the conductivity of a transistor 64 which, upon becoming conductive, energizes relay coils Ry-1 and R6-2. The relay coil Ry-2 controls the switch-over between "originate" and "answer" mode of both filters 46 and 47 as described below.

Figure 6:
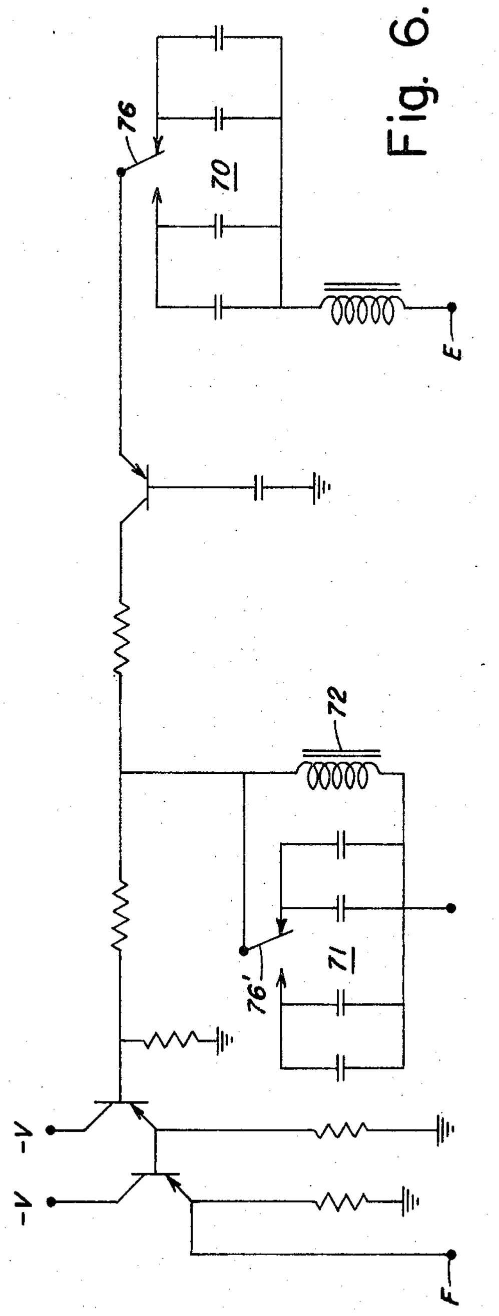

Referring now to FIG. 6, which illustrates the details of the filter 46, it will be seen that switch-over is again provided between banks of condensers, generally indicated at 70, 71. Filters 46, 47 may be identical, the only difference being in the actual values of the condensers, resistors and inductances used in each filter. As hereinabove mentioned, relay coil Ry-2 controls the switch-over between originate and answer made by operating switch arms 76 and 76'. Filter 46 is connected at terminals E, F as illustrated both in FIGS. 4 and 6. Filters 46, 47 are so dimensioned that pending upon the position of the switch arms, only signals having the frequencies assigned to "-mark" and "space" pulses are respectively passed.

The various biasing and connecting circuits, as well as coupling transistors and amplifiers, well known in the field and not presenting any unusual connections, are not further described and the proper parameters can readily be determined from design handbooks known to those skilled in the art. In addition, the logic decoder has not been further described except to say that it produces a different binary output signal in response to an originate signal from the teletype, then in response to an originate signal from the computer. It is obvious to those skilled in the art that many well-known devices and circuits function in this manner and may be used.

It should also be understood that the foregoing relates to only a preferred embodiment of the invention, and that it is intended to cover all changes and modifications of the example of the invention herein chosen for the purpose of the disclosure, which do not constitute departures from the spirit and scope of the invention.

We claim:

1. In combination with a portable computer terminal adapted to be coupled via a conventional telephone handset to a distant computer over telephone lines of the type wherein information to be transmitted to said computer is coded in mark space signals by a teletypewriter and then converted to audio frequency signals in a particular frequency band by a modulator means having an input coupled to said teletypewriter and an output coupled to a transmitting portion of said handset and wherein information from said computer is received and converted to coded mark space signals in another frequency band by a demodulator having an input coupled to a receiver portion of said handset and an output coupled to said teletypewriter wherein the improvement comprises:

a logic decode means adapted to receive an input originate signal and to provide one of two output control signals to said modulator means and to said demodulator means, said output control signal depending upon whether said originate signal is received from an operator of said portable computer terminal or from said computer whereby said modulator means and said demodulator means will have their different respective frequency bands interchanged upon change of said output control signal, and said modulator means including a filter circuit having a plurality of resistive branches, at least one of which is adapted to be short circuited in response to said output control signals.

2. The combination as recited in claim 1 wherein said demodulator means includes four filter circuits arranged in two sets of two filter units each, one of said sets having one filter tuned to a mark frequency signal for originate signals from said computer and the other filter tuned only to a mark frequency signal for originate signals from said transducer means, the other of said sets having one filter tuned to a space frequency for originate signals from said computer and the other filter tuned only to a space frequency signal for originate signals from said transducer means, and a demodulator mode switch means responsive to said output control signal to connect one filter circuit of each of said sets to provide for separate filtering of said mark and space signals.

3. The combination as defined in claim 1 including an additional switch filter means in circuit with said demodulator means and having a band width for passing both mark and space signals selectively depending upon whether said originate signal comes from said computer means or from said portable computer operator.

4. The combination as recited in claim 1 further including a modulator mode switch means comprised of transistors having their emitter-collector paths connected in circuit with said resistive branches and means interconnecting the control electrodes of said transistors to said logic decode means.

5. The combination as recited in claim 1 including additional switch filter means in circuit with said modulator and having a frequency band width for passing both said mark and space signals respectively, in response to said output control signals from said decode logic means.